United States Patent
Folk et al.

(10) Patent No.: US 10,156,184 B2
(45) Date of Patent: Dec. 18, 2018

(54) ANTI-RATTLE DEVICES AND TURBOCHARGER WASTEGATE ASSEMBLIES INCLUDING THE SAME

(71) Applicant: GM GLOBAL TECHNOLOGY OPERATIONS LLC, Detroit, MI (US)

(72) Inventors: Joseph W. Folk, Troy, MI (US); Andrew J. Matt, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 15/586,569

(22) Filed: May 4, 2017

(65) Prior Publication Data
US 2018/0320582 A1 Nov. 8, 2018

(51) Int. Cl.
*F02B 37/18* (2006.01)
*F02B 77/13* (2006.01)
*F01D 17/10* (2006.01)

(52) U.S. Cl.
CPC .......... *F02B 37/186* (2013.01); *F01D 17/105* (2013.01); *F02B 77/13* (2013.01)

(58) Field of Classification Search
CPC ...... F02B 77/13; F02B 37/186; F02B 37/183; F16B 37/044; F01D 17/105; F01D 25/04; F16C 11/02; Y10T 24/44778; F05D 2260/50; F05D 2220/40
USPC .............. 411/522; 24/99, 3.1; 60/602, 605.1
See application file for complete search history.

(56) References Cited

U.S. PATENT DOCUMENTS

| | | | |
|---|---|---|---|
| 1,392,561 A * | 10/1921 | Duffy | B62D 7/22 16/380 |
| 1,556,190 A * | 10/1925 | Withrow | F02M 1/00 74/503 |
| 3,427,897 A * | 2/1969 | Walter | F02D 11/04 411/520 |
| 5,347,690 A * | 9/1994 | Mansoor | B60R 19/52 24/294 |
| 5,423,646 A * | 6/1995 | Gagnon | F16B 37/041 411/174 |
| 6,101,686 A * | 8/2000 | Velthoven | F16B 5/065 24/289 |
| 6,928,705 B2 * | 8/2005 | Osterland | B60R 13/0206 24/289 |
| 7,399,151 B2 * | 7/2008 | Lubera | F16B 5/065 24/289 |
| 9,784,179 B2 * | 10/2017 | Zieboll | F02B 37/186 |

(Continued)

*Primary Examiner* — Phutthiwat Wongwian
*Assistant Examiner* — Edward Bushard

(57) ABSTRACT

Provided herein are anti-rattle devices and turbocharger wastegate assemblies including the same. The device can include a body having a first end and a second end, a bend, wherein the bend and the first end define a first section of the body, and the bend and the second end define a second section of the body, a cavity defined by the first section, the bend, and the second section, and an aperture extending between the first section and the second section. The device can include a U-shaped base defining an aperture and an open end, and at least one spring arm attached proximate the open end of the base bend and extending away from the open at least partially overlapping the base and defining a gap therebetween. The anti-rattle devices can be spring-loaded and can mate with a turbocharger wastegate assembly in one or more positions and provide anti-rattling benefits.

11 Claims, 4 Drawing Sheets

(56) References Cited

U.S. PATENT DOCUMENTS

| | | | | |
|---|---|---|---|---|
| 2005/0217082 A1* | 10/2005 | Vassiliou | ............. | F16B 5/0614 24/294 |
| 2013/0333379 A1* | 12/2013 | Hinkelmann | ......... | F01D 17/105 60/602 |
| 2016/0003135 A1* | 1/2016 | Jaegle | ................... | F02B 37/186 60/602 |

* cited by examiner

ANTI-RATTLE DEVICES AND TURBOCHARGER WASTEGATE ASSEMBLIES INCLUDING THE SAME

INTRODUCTION

During a combustion cycle of an internal combustion engine (ICE), air/fuel mixtures are provided to cylinders of the ICE. The air/fuel mixtures are compressed and/or ignited and combusted to provide output torque. Many diesel and gasoline ICEs employ a supercharging device, such as an exhaust gas turbine driven turbocharger, to compress the airflow before it enters the intake manifold of the engine in order to increase power and efficiency. Specifically, a turbocharger is a centrifugal gas compressor that forces more air (i.e., oxygen) into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power. In some applications, turbocharger components may rattle and cause undesired noise and component wear.

SUMMARY

One or more embodiments provide anti-rattle devices incorporated into turbocharger wastegate assemblies. A turbocharger wastegate assembly can include a turbine housing comprising an exhaust intake in fluid communication with a wastegate conduit, a wastegate positioned between the wastegate conduit and the exhaust intake, a rotatable shaft connected at one end to the wastegate and connected at an opposite end to the first end of an arm, and an actuating member operatively connected to a second end of the arm via a rod.

One or more other embodiments provide anti-rattle devices including an elongated body having a first end and a second end, a bend, wherein the bend and the first end define a first section of the body, and the bend and the second end define a second section of the body, a cavity defined by the first section, the bend, and the second section, and an aperture extending between the first section and the second section. The anti-rattle device can be spring loaded such that one or more of the first section and the second section apply a force outward from each other. The anti-rattle device can preload joints internally. The anti-rattle device can be mated with at least a portion of the rod such that the rod occupies space within the cavity. The first section of the body can exert a force on the actuating member and/or the second section of the body can exert a force on the arm to prevent or reduce rattling. The anti-rattle device can be mated with at least a portion of the rotatable shaft between the turbine housing and the arm, such that the rotatable shaft occupies space within the cavity. The first section of the body can exert a force on the arm and/or the second section of the body can exert a force on the turbine housing to prevent or reduce rattling.

One or more other embodiments provide anti-rattle devices including a U-shaped base defining an aperture and an open end, and at least one spring arm attached proximate the open end of the base bend and extending away from the open end and at least partially overlapping the base and defining a gap therebetween. The anti-rattle device can include two spring arms, each attached to the base on opposing sides of the open end and proximate the open end. The anti-rattle device can be spring loaded such that the base and/or the one or more spring arms apply a force outward from each other. The anti-rattle device can preload joints internally. The anti-rattle device can be mated with at least a portion of the rod such that the rod occupies space within the cavity. The one or more spring arms can exert a force on the actuating member and/or the U-shaped base can exert a force on the arm to prevent or reduce rattling. The anti-rattle device can be mated with at least a portion of the rotatable shaft between the turbine housing and the arm, such that the rotatable shaft occupies space within the cavity. The one or more spring arms can exert a force on the arm and/or the U-shaped base can exert a force on the turbine housing to prevent or reduce rattling. The anti-rattle device base can further comprise at least one locking hole proximate the base open end capable of accepting a locking pin. The locking pin can be disposed through the at least one locking hole such that the locking pin and U-shaped base restrain the rod or rotatable shaft within the anti-rattle device aperture.

Although many of the embodiments herein are described in relation to anti-rattle devices used for turbocharger wastegate assemblies, the embodiments herein are generally suitable for all wastegate assembly applications and also actuation linkages for variable volume and/or geometry turbochargers.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are turbocharger wastegate actuator anti-rattle devices. Turbochargers are commonly used to enhance the efficiency of internal combustion engines (ICE), which generally include a cylinder block with a plurality of cylinders arranged therein. The ICE can be of a spark ignition or a compression ignition design and can generally include any number of cylinder arrangements and a variety of reciprocating engine configurations including, but not limited to, V-engines, inline engines, and horizontally opposed engines, as well as both overhead cam and cam-in-block configurations. Combustion chambers are formed within the cylinders between a bottom surface of a cylinder head and the top of an associated piston configured to reciprocate within the cylinder. The combustion chambers are configured to receive a fuel-air mixture for subsequent combustion therein. Air is provided to the cylinders via an intake manifold. Combustion creates an exhaust gas which is communicated to an appurtenant turbocharger.

Figure 1:
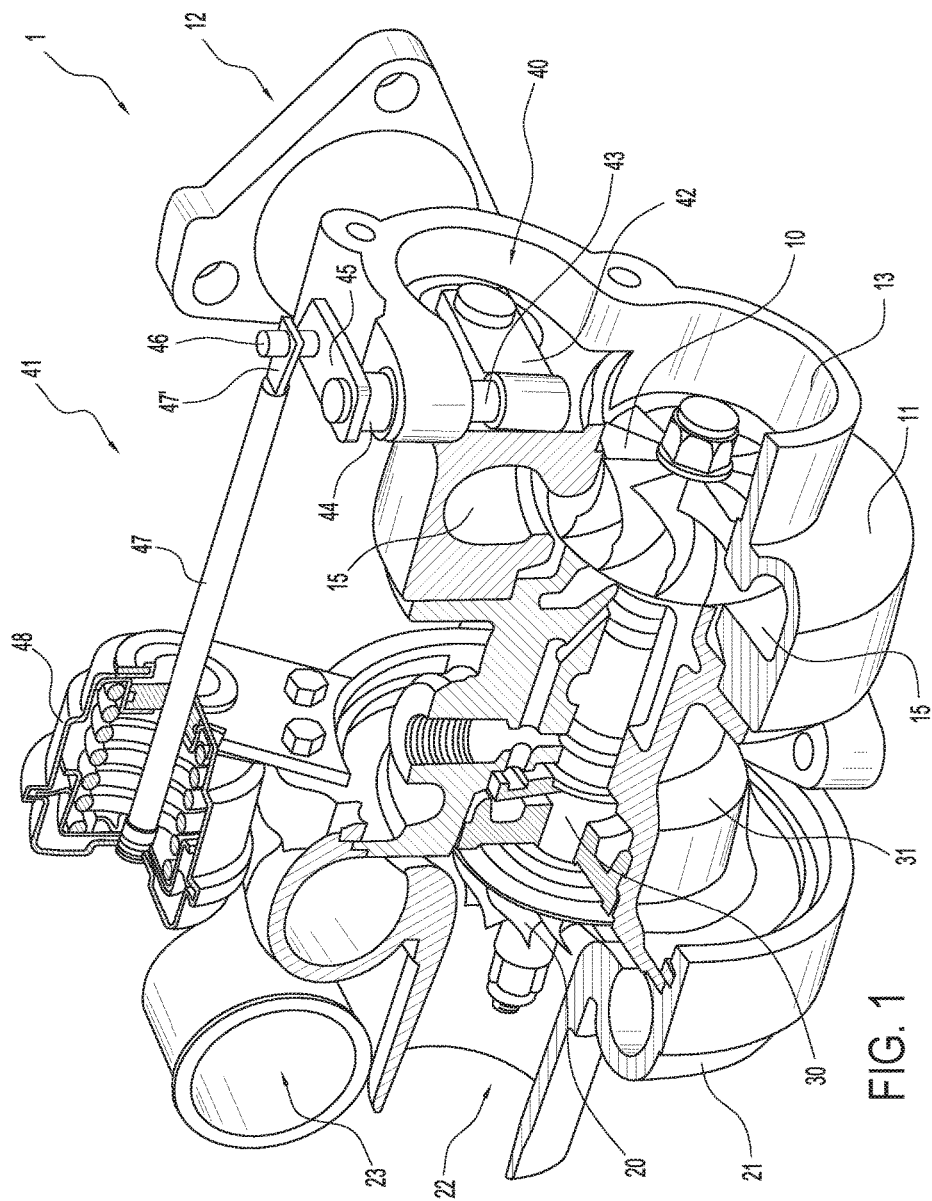
FIG. 1 illustrates a perspective view of a turbocharger, according to one or more embodiments.

Referring to the drawings wherein like reference numbers correspond to like or similar components throughout the several figures, FIG. 1 illustrates a turbocharger 1 which includes a turbine 10 disposed within a turbine housing 11, and a compressor 20 disposed within a compressor housing 21. The turbine 10 and the compressor 20 are mechanically coupled via a common rotatable shaft 30 which extends through a bearing housing 31. In operation, the turbine 10 receives exhaust gas from an ICE via a turbine exhaust intake 12. The intake 12 can communicate exhaust gas to the circumferential volute, or scroll, 15 which receives the exhaust gases and directs the same to the turbine 10. Exhaust gas thereafter is expelled from the turbine housing 11 via an exhaust conduit 13. The turbine 10 captures kinetic energy from the exhaust gases and spins the compressor 20 via the common shaft 30. Volumetric restrictions of the exhaust gas within the turbine housing 11 convert thermal energy into additional kinetic energy which is similarly captured by the turbine 10. For example, volute 15 can be particularly optimized to effect the conversion of thermal energy to kinetic energy. The rotation of the compressor 20 via the common shaft 30 draws in air through the compressor intake 22 which is compressed and delivered to the intake manifold of the appurtenant ICE via conduit 23.

The variable flow and force of exhaust gases introduced to the turbine housing 11 can influence the amount of boost pressure that can be imparted by the compressor 20 to the air drawn into the compressor housing 21 via compressor intake 22, and subsequently the amount of oxygen delivered to the ICE cylinders. In some instances, maximum translation of energy from exhaust gas to the compressor 20 is desired. In other instances, it is desired to limit boost pressure exerted by the compressor 20. Accordingly, a wastegate 42 is provided to limit the pressure and/or volumetric flow rate of the exhaust gas introduced into turbine housing 11. Generally, as referred to herein, a wastegate is any body capable of forming a fluid-tight seal with an aperture, or forming a seal which substantially or suitably limits fluid flow through an aperture. In the present example, wastegate 42 is positioned between the wastegate conduit 13 and the intake 12 and can actuate towards or to an open position and divert exhaust gas away from the turbocharger turbine 10 through a wastegate conduit 40 in order to limit the rotational speed of the turbine 10, and thereby limiting boost pressure. The wastegate conduit 40 can converge with exhaust conduit 13, for example. In a closed position, or while actuating towards a closed position, wastegate 42 can prevent or limit, respectively, exhaust gas flow to the wastegate conduit 40, and thereby maximize or increase, respectively, the rotational speed of the turbine 10.

Wastegate 42 is appurtenant to wastegate assembly 41, is configured to selectively divert exhaust gas towards the wastegate conduit 40 by actuating wastegate 42 to and between an open position and a closed position. Wastegate 42 is illustrated in FIG. 1 in a substantially closed position. Wastegate assembly further comprises a rotatable shaft 43 connected to the wastegate 42 within the turbine housing 11. A bushing 44 can optionally be disposed concentrically about the rotatable shaft 43 to facilitate rotation of the shaft 43 and prevent or reduce contact between the shaft 43 and at least a portion of the turbine housing 11 or other components. Rotatable shaft 43 extends outward from the turbine housing 11 and connects to a first end of an arm 45. The arm 45 can be fixed to the shaft 43 and can, in some embodiments, extend outward to a second end in a substantially perpendicular orientation relative to the axial direction of the shaft 43. An actuating member 47 is operatively connected to a second end of the arm 45 via a rod 46. As shown, rod 46 protrudes from the second end of arm 45, operatively connected the latter to actuating member 47 via an actuating member end 47'. As shown, actuator 48 is a pneumatic actuator which operates in a linear fashion, but the actuator 48 may alternatively be electrically actuated in either a linear or rotary fashion. It is to be understood that such alternative embodiments may include one or more additional linkage elements not shown in FIG. 1. In some embodiments, rod 46 can alternatively extend from actuating member end 47' and be operatively connected to arm 45. Rod 46 can be substantially parallel (i.e., within 2 degrees) with shaft 43, in some embodiments. Actuating member end 47' can include a rod aperture through which rod 46 can be disposed. Actuator 48 is operatively connected to actuating member 47 and is configured to manipulate arm 45 in order to actuate wastegate 42 to and between an open position and a closed position. It should be further noted that the embodiments provided herein are generally further suitable actuation linkages used in connection with variable volume and/or geometry turbochargers.

During operation, wastegate assembly 41 may cause undesired noise, rattling, and/or vibration (commonly known as "NVH"). Specifically, the shaft 43 may rattle against the optional bushing 44 and/or the turbine housing 11, the arm 45 may rattle against the turbine housing 11, rod 46 may rattle against actuating member end 47', and the arm 45 may rattle against the actuating member 47. Provided herein are anti-rattle devices, and wastegate assemblies and turbochargers utilizing the same, which minimize or eliminate undesired NVH.

Figure 2A:
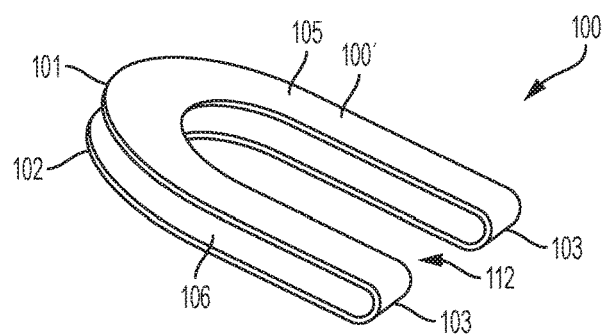
FIG. 2A illustrates a perspective view of an anti-rattle device, according to one or more embodiments.
Figure 2B:
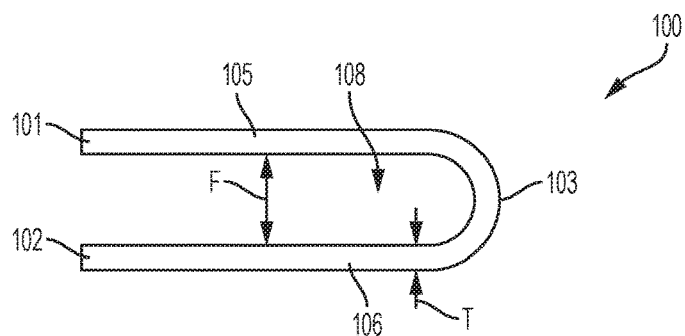
FIG. 2B illustrates a side view of anti-rattle device, according to one or more embodiments.
Figure 2C:
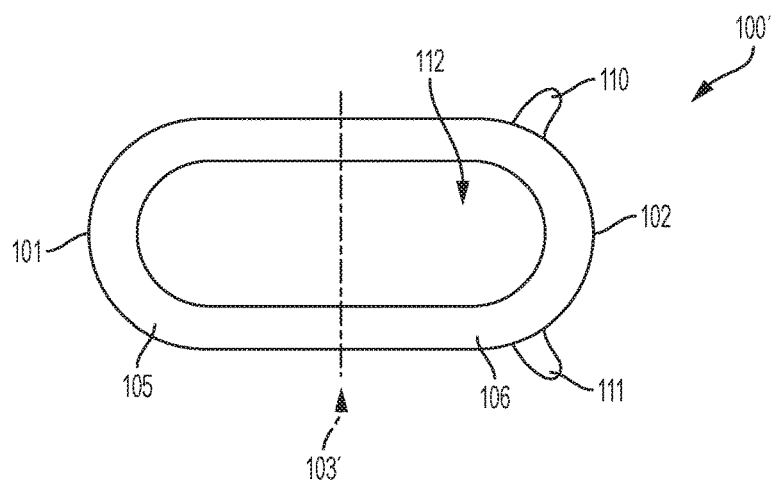
FIG. 2C illustrates a plan-view of an anti-rattle device elongated body, according to one or more embodiments.

FIG. 2A illustrates a perspective view of an anti-rattle device 100. FIG. 2B illustrates a side view of anti-rattle device 100. Device 100 comprises an elongated body 100' having a first end 101, a second end 102, and an aperture 112 therebetween. A bend 103 defines a first section 105 of the body and a second section 106 of the body. First section 105 extends from bend 103 towards the end 101. Second section extends between bend 103 the second end 102. First section 105, bend 103, and second section 106 define a cavity 108. FIG. 2C illustrates a plan-view of elongated body 100' (i.e., without bend 103). The approximate position of bend 103 is denoted 103'. Device 100 can further comprise one or more optional tabs 110 and 111, as shown in FIG. 2C, which extend radially outward from second section 106. Optional tabs 110 and 111 are also illustrated in FIG. 2C in an unbent position for clarity, but in a properly configured device 100 tabs 110 and 111 are bent away from first section 105 such that they are capable of restraining the movement of device 100 when mated with a turbocharger wastegate assembly 41 as described below. FIGS. 2B-C illustrate device 100 in a partially compressed orientation (i.e., with first section 105 and second section 106 in a generally parallel orientation). Prior to installation on a turbocharger assembly, as will be described below, device 100 can comprise a less compressed orientation (i.e., have an increased spacing between first end 101 and second end 102) in order to increase the spring force thereof, as will be described below.

The body 100' can have a thickness T. Thickness T can be substantially constant throughout the body, in some embodiments. Thickness T can be chosen to effect a desired spring force, as will be described below. In some embodiments, thickness T can comprise about 0.3 mm to about 3.0 mm. Device 100 is spring loaded by virtue of the bend 103. As shown in FIG. 2B, a force F is exerted by one or more of first section 105 and second section 106 driving the sections apart. Accordingly, one or more of first section 105 and second section are capable of applying a force when mated with an object, as will be described below. In some embodiments, first section 105 and second section 106 are parallel. In some embodiments, first section 105 and second section 106 are substantially parallel (i.e., within 3 degrees). In some embodiments, first section 105 and second section 106 are angled relative to each other. Aperture 112 is capable of accepting a rod, rotatable shaft, or bushing of a wastegate assembly, such as rod 46, rotatable shaft 43, or bushing 44, as will be described below.

Figure 3A:
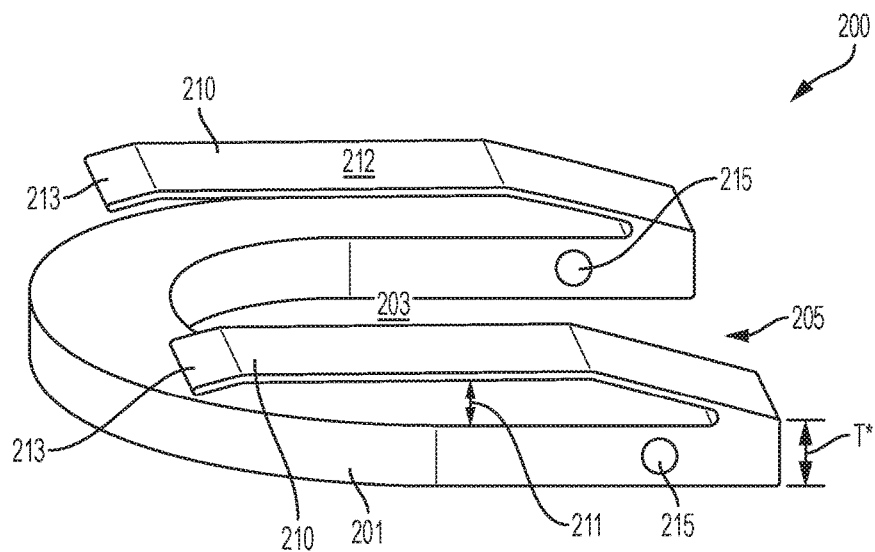
FIG. 3A illustrates a perspective view of an anti-rattle device, according to one or more embodiments.
Figure 3B:
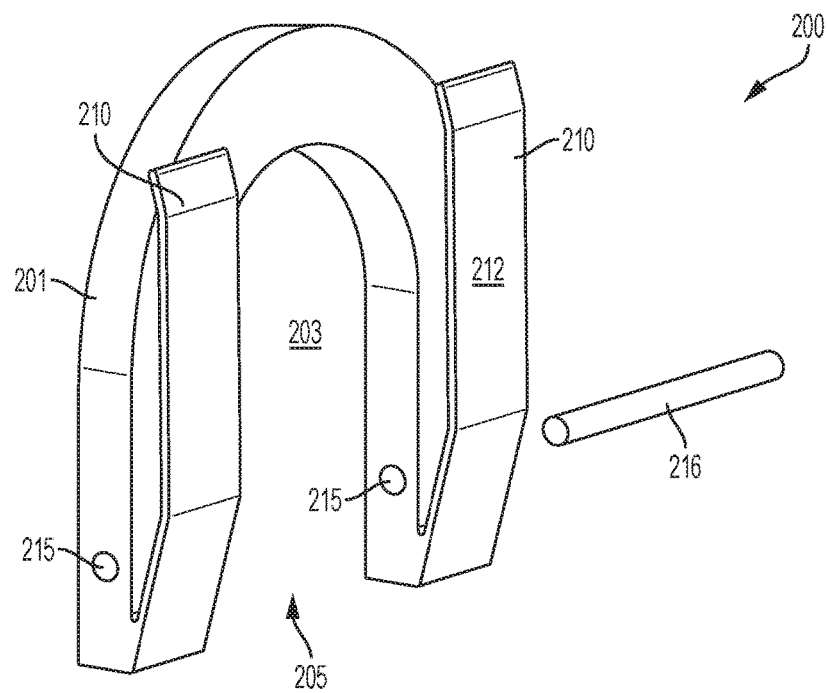
FIG. 3B illustrates a perspective view of an anti-rattle device, according to one or more embodiments.

FIGS. 3A-B illustrate perspective views of an anti-rattle device 200. Device 200 comprises a base 201 defining an aperture 203 and an open end 205. Base 201 can include a single member or a plurality of members. Base 201 is illustrated as a semi-ovular shape, although other shapes including semi-circular, square, rectangular, etc. are considered to be within the definition of a "U-shape". Device 200 further comprises at least one spring arm 210. Spring arm 210 can be attached proximate the open end 205 of base 201. Spring arm 210 can extend away from open end 205 and in some embodiments partially overlap the base 201. Spring arm 210 and base 201 define a gap 211 therebetween, at which the spring arm 210 can be considered to be in a neutral position. When the distance between spring arm 210 and base 201 is less than gap 211, spring arm 210 is capable of exerting a force away from base 201. Device can be spring loaded such that one or more of base 201 and the at least one spring arm 210 apply a force outward from each other.

In some embodiments, spring arm 210 comprises a contacting portion 212 configured for interaction with an element of a turbocharger wastegate assembly, such as wastegate assembly 41 as will be described below. Contacting portion 212 can be configured for interaction by virtue of its contour (e.g., flat), material of construction (e.g., a metal designed to withstand abrasion or avoid galvanic corrosion), or texture (e.g., machined metal for increased friction). As shown, device 200 comprises two spring arms 210. In some embodiments, the two spring arms 210 can be joined at their ends for structural stability or geometric compatibility with mated component, for example.

Base can further comprise at least one locking hole 215 capable of accepting a locking pin 216. Locking pin 216 is illustrated as a straight pin, but other embodiments similarly suitable, including cotter pins and bent pins, for example. In some embodiments, locking pin 216 can comprise a chain, wire, or otherwise flexible body. In many embodiments, base 201 comprises two locking holes 215 proximate open end 205. Base 201 can have a thickness T*. Thickness T* can be substantially constant throughout base 201, in some embodiments. For embodiments wherein base 201 comprises one or more locking holes 215, thickness T* can be increased to lend sufficient structural characteristics to base 201.

Devices 100 and/or 200 can comprise metal, in some embodiments. Suitable metals are those capable of maintaining strength (i.e., spring load) at high temperatures. Steel is a suitable metal in some embodiments, such as 304 stainless steel. In other embodiments, various iron, nickel, chromium, and/or cobalt alloys can be utilized. It is understood that other metals may be suitable for use with the disclosed devices and assemblies.

Figure 4A:
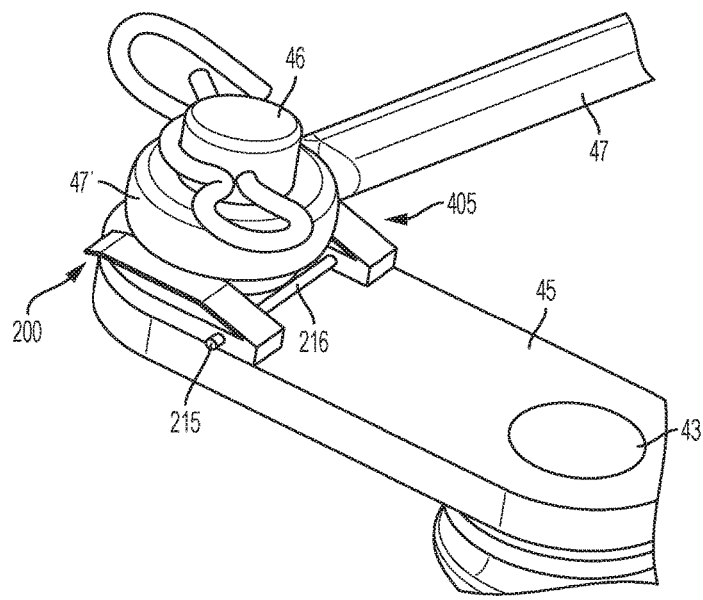
FIG. 4A illustrates a perspective view of a turbocharger wastegate assembly, according to one or more embodiments.
Figure 4B:
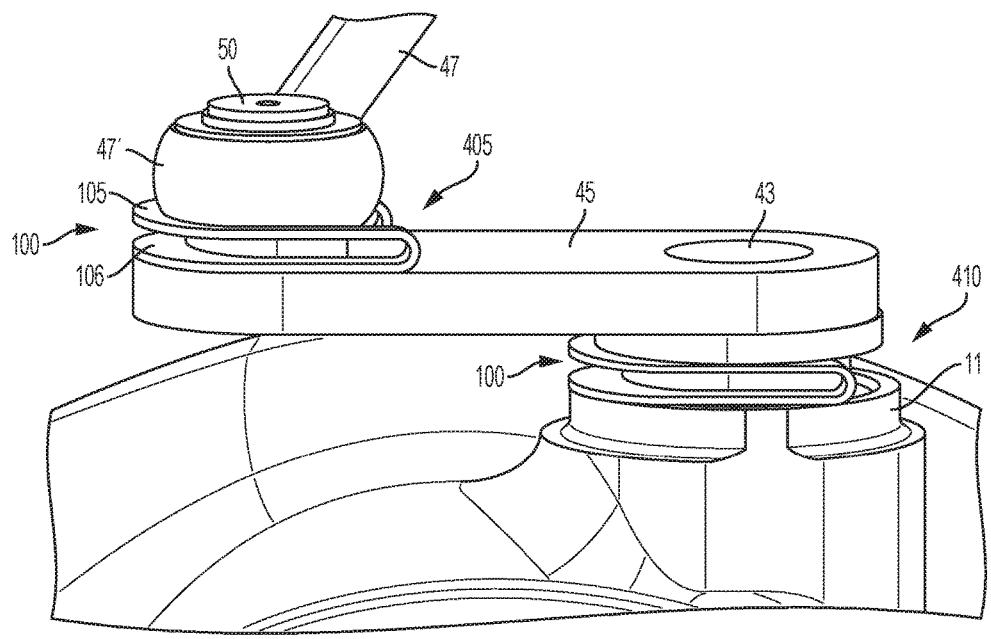
FIG. 4B illustrates a perspective view of a turbocharger wastegate assembly, according to one or more embodiments.

FIGS. 4A-B illustrate perspective views of a turbocharger wastegate assembly 41 including anti-rattle devices 100 and 200. In FIG. 4A, device 200 is shown in mating position 405 such that rod 46 occupies space within in aperture 203. In some embodiments, aperture 203 comprises a width and/or shape which corresponds to the diameter and/or shape of rod 46 such that rod 46 is capable of occupying aperture 203 and that movement of rod 46 within aperture 203 is limited as desired or prevented. Device 200 is illustrated with optional locking pin 216 disposed through two locking holes 215 such that rod 46 is restrained within aperture 203. As shown in FIG. 4B, device 100 is similarly shown in mating position 405 such that rod 46 occupies space within aperture 112. In some embodiments, aperture 112 comprises a width and/or shape which corresponds to the diameter and/or shape of rod 46 such that rod 46 is capable of occupying aperture 112 and that movement of rod 46 within aperture 112 is limited as desired or prevented.

Devices 100 and 200 are spring loaded, and apply a force (e.g., F1) such that arm actuating member 47 and arm 45 are pressed apart and rattling or other undesirable NVH is prevented or reduced. Specifically in the case of device 200, the one or more spring arms 210 exert a force against actuating member 47 and/or base 201 exerts a force against arm 45. The orientation of device 200 can be reversed such that the one or more spring arms 210 exert a force against arm 45 and/or base 201 exerts a force against actuating member 47. Specifically in the case of device 100, first section 105 exerts a force against actuating member 47 and/or second section 106 exerts a force against arm 45. Devices 100 and 200 advantageously internally preloads the joint between actuating member 47 and arm 45.

Actuating member end 47' is maintained on rod 46 in various suitable ways. As shown in FIG. 4A, rod 46 further optionally comprises an aperture with which a pin 49 can be mated. When pin 49 is mated with rod 46, the pin 49 serves to maintain the actuating member end 47' in an axial location of the rod 46 below the pin 49. As shown in FIG. 4B, rod 46 further optionally comprises a restraining cap 50. Restraining cap 50 can comprise a rivet or other like feature capable of maintaining an operable connection between actuating member 47 and rod 46. For example, restraining cap 50 can comprise a diameter greater than the diameter of the rod aperture of actuating member 47. Pin 49, restraining cap 50, and other suitable means can be used interchangeably with devices 100 and 200.

FIG. 4B further illustrates a second device 100 in mating position 410 such that rotatable shaft 43 occupies space within aperture 112. Alternatively, in some embodiments, device 200 can be utilized in mating position 410 such that rotatable shaft 43 occupies space within aperture 203. In either instance, in some embodiments, aperture 203 of device 200 or aperture 112 of device 100 comprises a width and/or shape which corresponds to the diameter and/or shape of rotatable shaft 43 such that rod rotatable shaft 43 is capable of occupying aperture 203 or 112 and that movement of rotatable shaft 43 is limited as desired or prevented. In embodiments where turbocharger wastegate assembly 41 comprises an optional bushing 44, mating accommodations relating to the geometry of devices 100 and/or 200 can be made commensurate with those made for rotatable shaft 43. It is to be understood that device 100 and 200 can be used interchangeably in mating position 405 and 410, as desired. Devices 100 and 200 are spring loaded, and, when in mating position 410, apply a force (e.g., F1) such that arm 45 is pressed away from turbine housing 11 such that rattling is prevented or reduced. In embodiments comprising optional bushing 44, bushing 44 can additionally or alternatively be pressed into turbine housing 11 away from arm 45 such that rattling is prevented or reduced. Similar to above, devices 100 and 200 in mating position 410 advantageously internally preloads the joint between arm 45 and turbine housing 11. A plurality of devices 100 and/or 200 in mating positions 405 and 410 can provided synergistic NVH reduction or prevention benefits. Further, devices 100 and/or 200 can be installed in mating positions 405 and 410 without disassembling appurtenant turbocharger 1 components. In some embodiments, wastegate assembly 41 is utilized in non-turbocharger applications. Accordingly, turbine body 11 as illustrated in FIGS. 4A-B can comprise a pipe, or other body capable of directing or containing a fluid.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A turbocharger wastegate assembly, the assembly comprising:
   a turbine housing comprising an exhaust intake in fluid communication with a wastegate conduit;
   a wastegate positioned between the wastegate conduit and the exhaust intake;
   a rotatable shaft connected at one end to the wastegate and connected at an opposite end to the first end of an arm;
   an actuating member operatively connected to a second end of the arm via a rod; and
   an anti-rattle device comprising:
      a U-shaped base defining an aperture and an open end; and
      at least one spring arm attached proximate the open end of the base bend and extending away from the open at least partially overlapping the base and defining a gap therebetween;
   wherein at least a portion of the rod is mated with the anti-rattle device aperture and occupies space within the cavity such that the at least one spring arm exerts a force on the actuating member and/or the base exerts a force on the arm to prevent or reduce rattling.

2. The turbocharger wastegate assembly of claim 1, wherein the anti-rattle device base further comprises at least one locking hole proximate the base open end capable of accepting a locking pin.

3. The turbocharger wastegate assembly of claim 2, wherein the anti-rattle device further comprises a locking pin disposed through the at least one locking hole, such that the locking pin and U-shaped base restrain the rod within the anti-rattle device aperture.

4. The turbocharger wastegate assembly of claim 1, wherein the anti-rattle device comprises two spring arms, each attached to the base on opposing sides of the open end and proximate the open end.

5. The turbocharger wastegate assembly of claim 1, wherein the aperture comprises a width which corresponds to the diameter of the rod.

6. The turbocharger wastegate assembly of claim 1, wherein the anti-rattle device is spring loaded such that one or more of the base and the at least one spring arm apply a force outward from each other.

7. The turbocharger wastegate assembly of claim 1, further comprising a second anti-rattle device including:
   an elongated body having a first end and a second end;
   a bend, wherein the bend and the first end define a first section of the body, and the bend and the second end define a second section of the body;
   a cavity defined by the first section, the bend, and the second section; and
   an aperture extending between the first section and the second section,
   wherein at least a portion of the rotatable shaft between the turbine housing and the arm is mated with the second anti-rattle device aperture and occupies space within the cavity such that the first section of the body exerts a force on the arm and/or the second section of the body exerts a force on the turbine housing to prevent or reduce rattling.

8. The turbocharger wastegate assembly of claim 1, further comprising a second anti-rattle device including:
   a U-shaped base defining an aperture and an open end; and
   at least one spring arm attached proximate the open end of the base bend and extending away from the open at least partially overlapping the base and defining a gap therebetween;
   wherein at least a portion of the rotatable shaft between the turbine housing and the arm is mated with the second anti-rattle device aperture and occupies space within the cavity such that the first section of the body exerts a force on the arm and/or the second section of the body exerts a force on the turbine housing to prevent or reduce rattling.

9. The turbocharger wastegate assembly of claim 8, wherein the second anti-rattle device comprises two spring arms, each attached to the base on opposing sides of the open end and proximate the open end.

10. The turbocharger wastegate assembly of claim 1, wherein the anti-rattle device internally preloads the joint between the actuating member and the arm.

11. The turbocharger wastegate assembly of claim 1, wherein one or more of the base and the at least one spring arm comprise metal.

\* \* \* \* \*